United States Patent
Inoue et al.

(10) Patent No.: US 9,592,544 B2
(45) Date of Patent: Mar. 14, 2017

(54) DRAW FORMING METHOD

(71) Applicant: NISSAN MOTOR CO., LTD., Yokohama-shi, Kanagawa (JP)

(72) Inventors: Seiji Inoue, Ebina (JP); Yusuke Matsuno, Zama (JP); Yasushi Murakami, Hadano (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/655,176

(22) PCT Filed: Dec. 25, 2013

(86) PCT No.: PCT/JP2013/084555
§ 371 (c)(1),
(2) Date: Jun. 24, 2015

(87) PCT Pub. No.: WO2014/104047
PCT Pub. Date: Jul. 3, 2014

(65) Prior Publication Data
US 2015/0343514 A1    Dec. 3, 2015

(30) Foreign Application Priority Data
Dec. 26, 2012    (JP) .................... 2012-282192

(51) Int. Cl.
*B21D 35/00*    (2006.01)
*B23K 31/02*    (2006.01)
*B21D 22/20*    (2006.01)
*B21D 22/26*    (2006.01)
*B21D 24/16*    (2006.01)
*B21D 22/22*    (2006.01)

(52) U.S. Cl.
CPC ........... *B21D 35/002* (2013.01); *B21D 22/20* (2013.01); *B21D 22/22* (2013.01); *B21D 22/26* (2013.01); *B21D 24/16* (2013.01); *B23K 31/02* (2013.01)

(58) Field of Classification Search
None
See application file for complete search history.

(56) References Cited

U.S. PATENT DOCUMENTS 3,460,367 A * 8/1969 Subovici ............. H01F 41/0206
                                                                29/607
5,701,777 A * 12/1997 Yamanaka ............. B21D 22/22
                                                                72/350
7,117,708 B2 * 10/2006 Yamano ................... B21D 5/01
                                                                72/347

(Continued)

FOREIGN PATENT DOCUMENTS

JP    58-205618 A    11/1983
JP    63-16819 A    1/1988

(Continued)

*Primary Examiner* — Devang R Patel
(74) *Attorney, Agent, or Firm* — Foley & Lardner LLP

(57) ABSTRACT

A draw bead is formed in a plate-shaped material in which a drawn portion is formed, outside the drawn portion, the draw bead being used to adjust an inflow of the plate-shaped material into a drawing die. The drawn portion is drawn in the plate-shaped material by using the draw bead as formed. The draw bead is crushed and flattened after the drawn portion is drawn.

5 Claims, 10 Drawing Sheets

(56) References Cited

U.S. PATENT DOCUMENTS

2006/0137422 A1* 6/2006 Kodaka ................. B21D 24/04
                                                    72/350
2009/0049886 A1* 2/2009 Okuzumi ............... B21D 24/04
                                                    72/475
2012/0318034 A1    12/2012 Moore et al.

FOREIGN PATENT DOCUMENTS

| JP | 09-070626 A  | 3/1997 |
| JP | 2004-291005 A | 10/2004 |
| RU | 2 302 919 C2 | 7/2007 |
| SU | 1754277 A1 | 8/1992 |

* cited by examiner

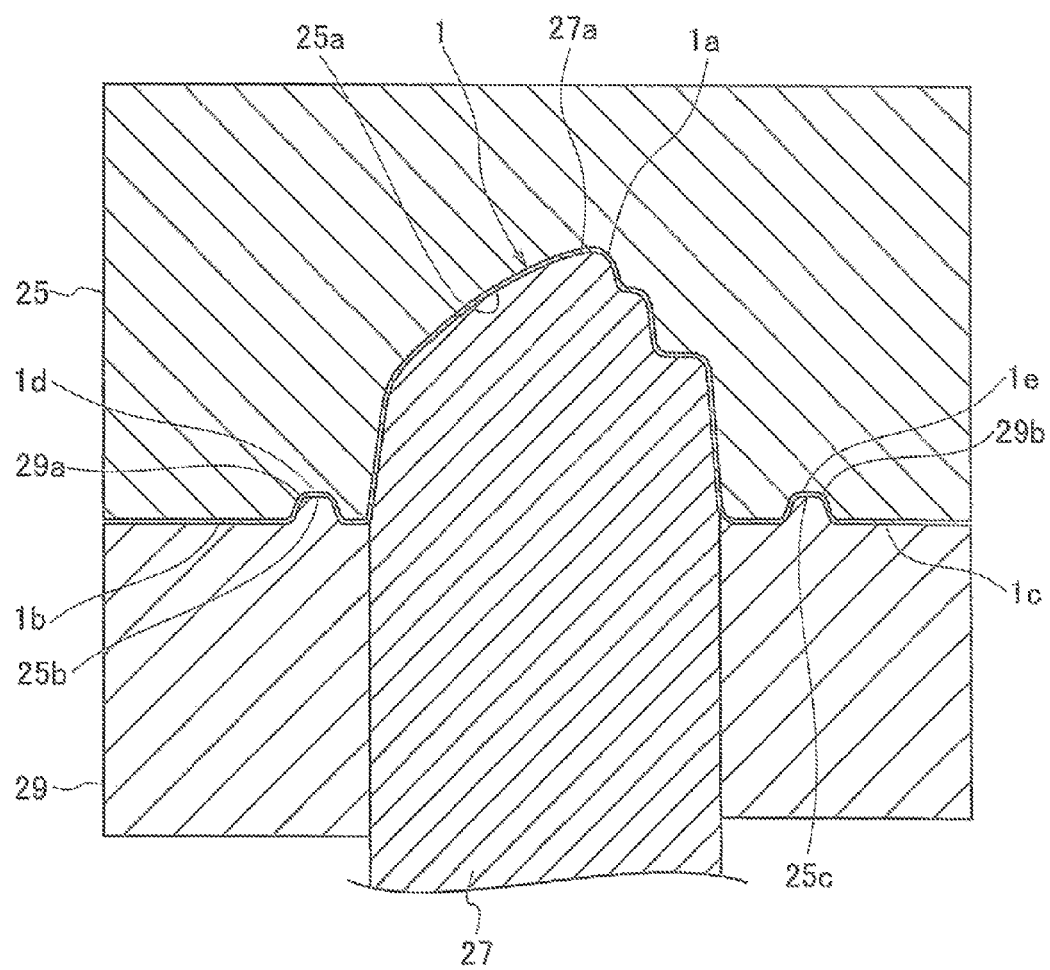

DRAW FORMING METHOD

TECHNICAL FIELD

The present invention relates to a drawing method in which, in a case of drawing a plate-shaped material, the inflow of the material into a drawing die is adjusted by a draw bead provided outside a drawn portion.

BACKGROUND ART

When a plate-shaped material is drawn by press work, draw beads having recess and protruding shapes set in upper and lower dies are formed at peripheral edge portions of the plate-shaped material to adjust the amount of material entering a drawing die. In a case where the draw beads are provided outside a product shape, portions provided with the draw beads are unnecessary after the drawing work and need to be removed. The yield of material thus lowers by the amount corresponding to the removed portions.

In view of this, Patent Literature 1 proposes a method in which, in a case of drawing multiple protruding shapes, draw beads having shapes similar to the protruding shapes to be drawn later are formed in end portions of a material. Since the draw beads having shapes similar to the protruding shapes are formed into a product shape (protruding shapes) in the drawing performed later, there is no need to remove the draw beads.

CITATION LIST

Patent Literature

Patent Literature 1: Japanese Unexamined Patent Application Publication No. S63-16819

SUMMARY OF INVENTION

In the drawing method described above, the draw beads need to be formed into shapes similar to the product shape. Thus, the shape of a drawn portion (product) is restricted and the degree of freedom in the product shape decreases.

An object of the present invention is to provide a drawing method capable of increasing the degree of freedom in a product shape while suppressing lowering of the yield of material in a case where drawing is performed by using a draw bead.

A drawing method in accordance with one embodiment includes: forming a draw bead in a plate-shaped material in which a drawn portion is formed, outside the drawn portion, the draw bead being used to adjust an inflow of the plate-shaped material into a drawing die; drawing the drawn portion in the plate-shaped material by using the draw bead as formed; and crushing and flattening the draw bead after drawing the drawn portion.

BRIEF DESCRIPTION OF DRAWINGS

FIG. 2 is an overall cross-sectional view at the time of drawing work which corresponds to FIG. 1A.

DESCRIPTION OF EMBODIMENTS

Embodiments of the present invention axe described below based on the drawings.

Figure 1A:
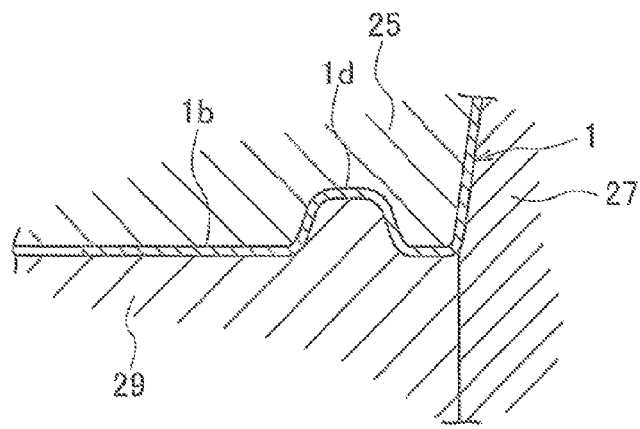
FIG. 1A is a processing step diagram showing a drawing method in a first embodiment of the present invention.
Figure 1B:
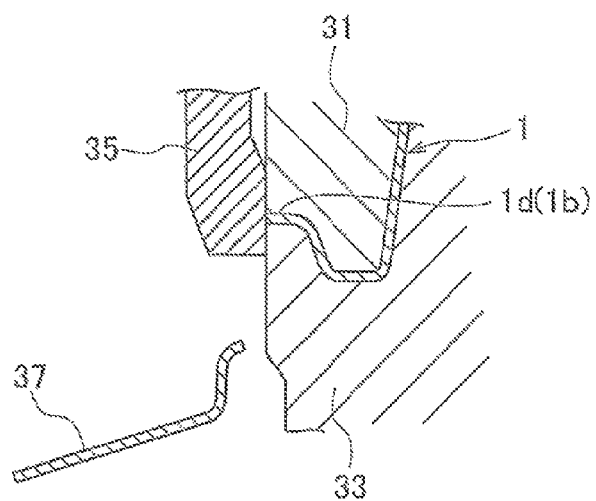
FIG. 1B is a processing step diagram which is subsequent to FIG. 1A and which shows the drawing method.
Figure 1C:
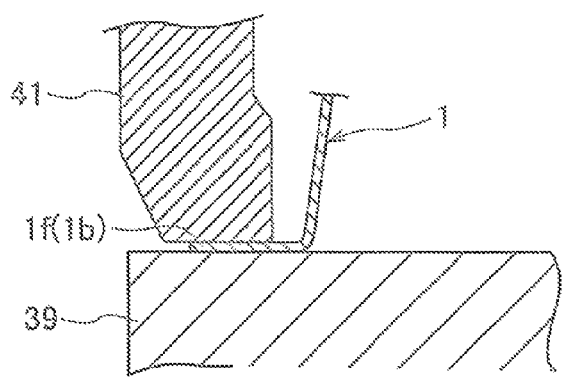
FIG. 1C is a processing step diagram which is subsequent to FIG. 1B and which shows the drawing method.

FIGS. 1A to 1C show a drawing method in a first embodiment of the present invention, and a workpiece 1 which is a plate-shaped material is drawn by press work as shown in FIG. 2. A press-formed product herein is used as a side sill 5 which is a vehicle body component part of an automobile as shown in FIG. 4 and which is located in a lower portion of a body side outer panel 3.

Figure 4:
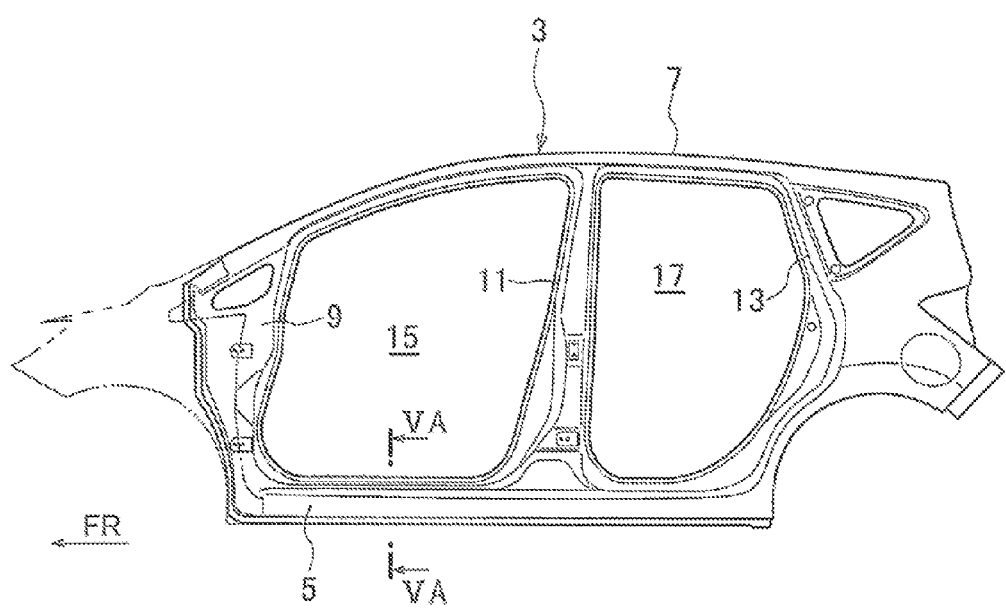
FIG. 4 is a side view showing a body side of an automobile to which the drawing method of the first embodiment is applied.

The direction shown by the arrow FR in FIG. 4 is a vehicle-body front side. The side sill 5 and a roof rail 7 in an upper portion are connected to each other by a front pillar 9, a center pillar 11, and a rear pillar 13 which are arranged in this order from the vehicle-body front side toward a vehicle-body rear side. A front door opening portion 15 is formed behind the front pillar 9 and in front of the center pillar 11, while a rear door opening portion 17 is formed behind the center pillar 11 and in front of the rear pillar 13.

Figure 5A:
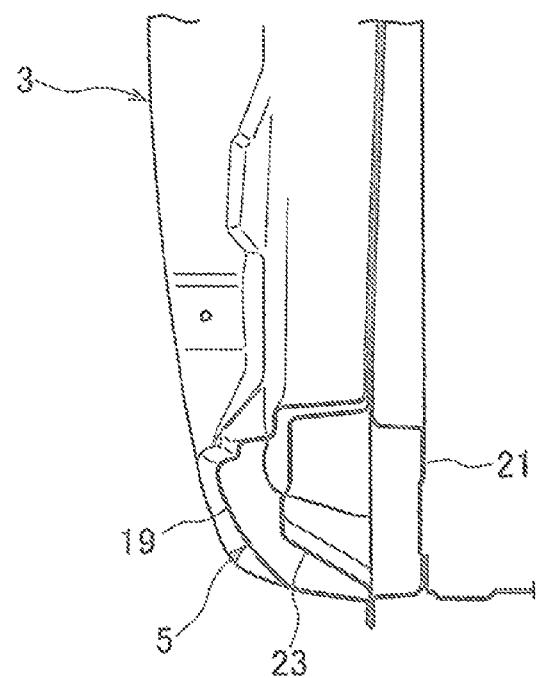
FIG. 5A is across-sectional view taken along the VA-VA line of FIG. 4.
Figure 5B:
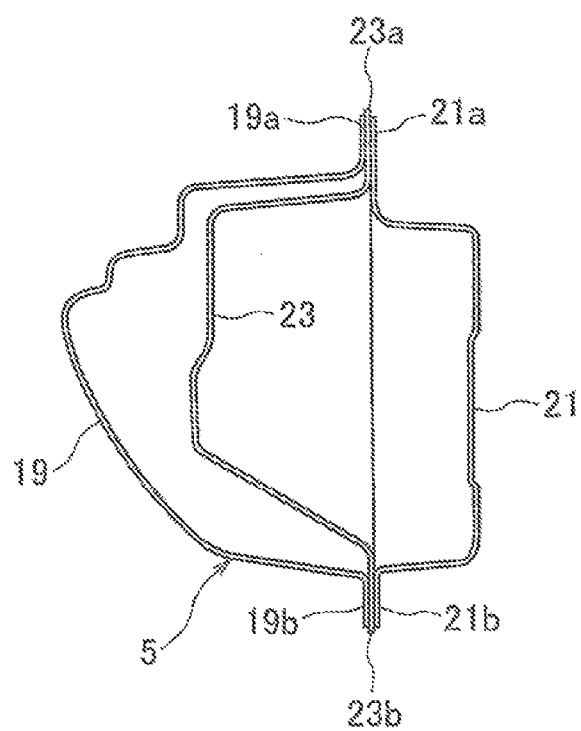
FIG. 5B is a cross-sectional view of a main portion of FIG. 5A.

As shown in FIGS. 5A and 5B, the side sill 5 includes a sill outer 19, a sill inner 21, and a reinforcement 23 disposed between the sill outer 19 and the sill inner 21. Upper flanges 19a, 21a, and 23a of these three members are made to overlap each other, and lower flanges 19b, 21b, and 23b thereof are also made to overlap each other. The flange portions are joined and fixed to one another by spot welding. In the embodiment, description is given of drawing work of the sill outer 19 out of these members.

As shown in FIGS. 2 and 1A, when the workpiece 1 is drawn into the sill outer 19, an upper die 25, a lower die 27 formed of a punch, and a blank holder 29 are used as a drawing die. A protruding portion 1a of the workpiece 1 (sill outer 19) which is a drawn portion protruding toward a vehicle-body outer side is drawn between a recess portion 25a of the upper die 25 and a front end portion 27a of the lower die 27. In this drawing work, flange portions 1b and 1c located on both sides of the protruding portion 1a are pressed by the upper die 25 and the blank holder 29 from above and below to be held therebetween. The blank holder 29 has an annular shape (tubular shape) surrounding the periphery of the lower die 27 formed of the punch.

Draw beads 1d and 1e protruding in the same direction as the protruding portion 1a are formed in the flange portions 1b and 1c of the workplace 1. Each of the draw beads 1d and 1e extends in a direction orthogonal to a sheet surface of FIG. 2 and may be a continuous one bead or a set of multiple beads provided intermittently. Bead recess portions 25b and 25c are provided in the upper die 25 to correspond to the draw beads 1d and 1e, and bead protruding portions 29a and 29b are provided in the blank holder 29 to correspond to the draw beads 1d and 1e.

In a case of drawing the workplace 1 to form the protruding portion 1a which is a main portion of the product, forming the draw beads 1d and 1e can adjust the inflow of a material into the drawing die used to form the protruding portion 1a, and a stable product shape is thus obtained. Note that sizes and shapes of the draw beads 1d and 1e are not limited those shown in the drawings and can be changed as appropriate depending on the size and shape of the protruding portion 1a to be drawn. For example, the draw beads 1d and 1e may protrude downward in FIG. 2.

After the drawing work is performed by using the draw beads 1d and 1e as shown in FIGS. 2 and 1A, part (including part of the draw bead 1d) of the flange portion 1b of the workpiece 1 taken out after die-opening is removed by cutting work. FIG. 1A corresponds to FIG. 2, while FIG. 1B shows a state where the part of the flange portion 1b of the drawn workpiece 1 taken out from the drawing die of FIG. 2 is removed. The workpiece 1 is pressed by an upper pressing die 31 and a lower pressing die 33 from above and below to be held therebetween.

Figure 3A:
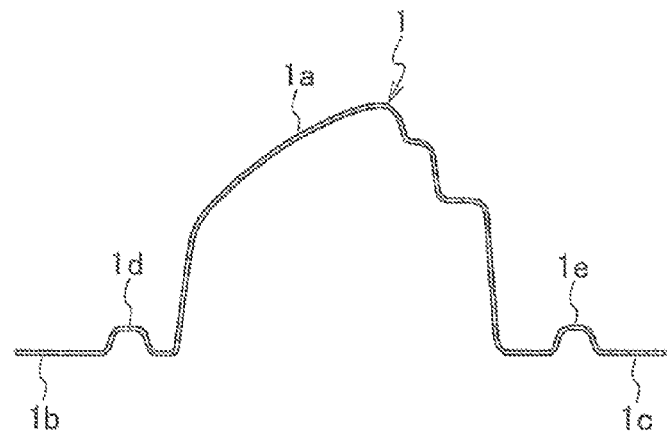
FIG. 3A is a shape explanatory view showing the shape of a workpiece at a point corresponding to the processing step of FIG. 1A.
Figure 3B:
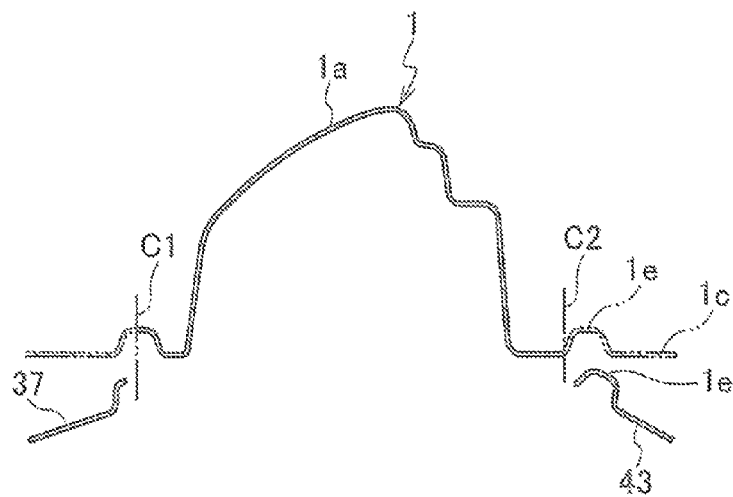
FIG. 3B is a shape explanatory view showing the shape of the workplace at a point corresponding to the processing step of FIG. 1B.

A cutting blade 35 is moved downward hi this state to remove the part (including the part of the draw bead 1d) of the flange portion 1b by cutting work, and scrap material 37 is generated. In other words, the part of the draw bead 1d is removed. In FIG. 3B, a cut position in the cutting work described above is shown by the cutting line C1.

After the part (including the part of the draw bead 1d) of the flange portion 1b is removed, work of crushing and flattening a remaining portion of the draw bead 1d is performed. FIG. 1C shows a state where the work of crushing and flattening the remaining portion is performed. The workpiece 1 is placed on a die 39 and, in this case, the flange portion 1b having the draw bead 1d is in contact with a top of the die 39.

A punch 41 is lowered from above to apply a pressure with the workpiece 1 placed on the die 39, and the draw bead 1d is thereby crushed and flattened. A portion of the flange portion 1b having the draw bead 1d is thus formed into a flat portion 1f corresponding to the flange portion 19b of the sill outer 19 shown in FIG. 5B.

Meanwhile, in the flange portion 1c located on the right side of the workpiece 1 in FIG. 2, the entire draw bead 1e is removed by cutting work at the position of the cutting line C2 as shown in FIG. 3B, and a scrap material 43 including the draw bead 1e is generated. This cutting work is performed in a method similar to the cutting work shown in FIG. 1B.

Figure 3C:
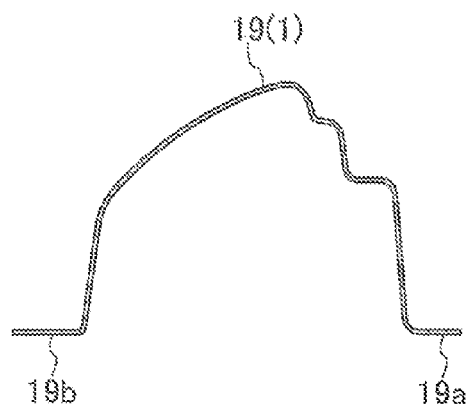
FIG. 3C is a shape explanatory view showing the shape of the workpiece at a point corresponding to the processing step of FIG. 1C.

The sill outer 19 of the side sill 5 as shown in FIG. 3C is completed by the processing work described above. Drawing work similar to that for the sill outer 19 described above can be performed for the sill inner 21 and the reinforcement 23 shown in FIGS. 5A and 5B.

Note that the drawing work on the sill outer 19 shown in FIG. 2 is performed together with the press work on the entire body side outer panel 3 shown in FIG. 4. In this case, the front door opening portion 15 and the rear door opening portion 17 are punched out before the drawing work.

The sill outer 19 subjected to the drawing work as described above is joined and fixed by spot welding as shown in FIG. 5B to the sill inner 21 and the reinforcement 23 which are drawn in a similar way. In the embodiment, in the formation of the lower flange portion 19b of the sill outer 19, the flange portion 1b of the workpiece 1 is removed not in such a way that the entire draw bead 1d is included in the removed portion but in a such a way that the part of the draw bead 1d is included in the removed portion. In other words, the part of the draw bead 1d is left to be included in the sill outer 19 which is the product.

Then, the part of the draw bead 1d is crushed and flattened as shown in FIG. 1C, and the flange portion 19b is joined to the flange portion 21b of the sill inner 21 via the flange portion 23b of the reinforcement 23 with the crushed portion being used as part of the flange portion 19b. The portion including the crushed portion of the draw bead 1d is thus included in the flange portion 19b of the sill outer 19 which is the product.

Crushing and flattening the draw bead 1d facilitates spot welding of the flange portions and the degree of adhesion among the flanges increases. This improves watertightness in a flange part including the flange portion 19b which is located in the lower portion of the side sill 5 and which is located close to a road surface.

In the embodiment, the flange portion 1b is removed not in such a way that the entire draw bead 1d is included in the removed portion but in such a way that the part of the draw bead 1d is included in the removed portion as described above. Due to this, at least the part of the draw bead 1d is incorporated in the product.

Accordingly, the yield of material in the embodiment is better than that in the case where the flange portion 1b is removed in such a way that the entire draw bead 1d is included in the removed portion, provided that the protruding length (length in an up-down direction in FIG. 5B) of the flange portion 19b of the sill outer 19 is the same in both cases. The lowering of the yield can be thus suppressed. Moreover, the draw bead 1d is crushed and flattened alter the drawing before being formed into the product to be used as the flange portion 19b. Hence, the product shape, particularly the shape of the protruding portion 1a which is the main portion of the product is less likely to be restricted, and decrease of the degree of freedom in the product shape can be suppressed. Furthermore, forming the flange portion 19b in a flat shape can improve the quality of external appearance. This is because, although the flange portion 19b is a less-visible portion provided in the lower portion of the vehicle body, the flange portion 19b is still a visible portion.

In the embodiment described above, the case where one draw bead 1d is formed in the flange portion 1b is described. However, multiple draw beads 1d may be formed in the flange portion 1b. In this case, the inflow of the material in the drawing can be more surely suppressed due to the increased number of the draw beads 1d. Then, part of the flange portion 1b including the draw beads 1d except for the draw bead 1d at a position closest to the protruding portion 1a which are provided outside this draw bead 1d are removed with only the draw bead 1d at the closest position being left. This can reduce the applied pressure compared to a case where all of the multiple draw beads 1d are left and crushed, and the crushing work is thus facilitated. Note that, also in this case, the part of the flange portion 1b may be removed in such a way that part of the draw bead 1d at the position closest to the protruding portion 1a is left as shown in FIG. 1B.

Figure 6A:
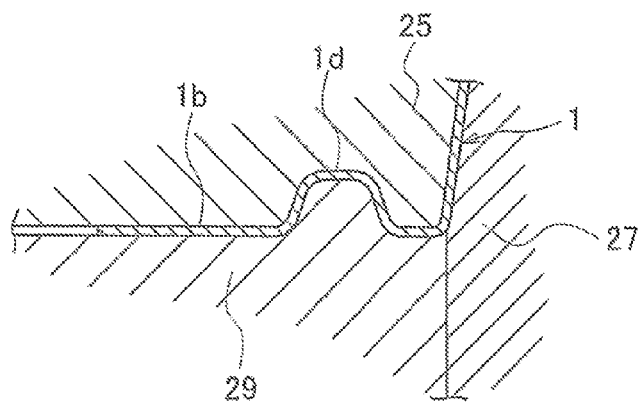
FIG. 6A is a processing step diagram showing a drawing method in a second embodiment.
Figure 6B:
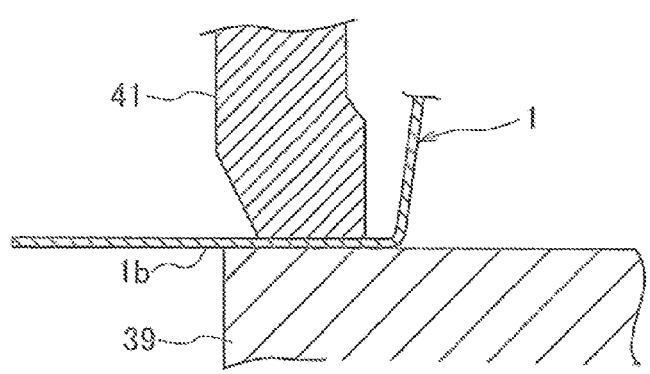
FIG. 6B is a processing step diagram which is subsequent to FIG. 6A and which shows the drawing method.
Figure 6C:
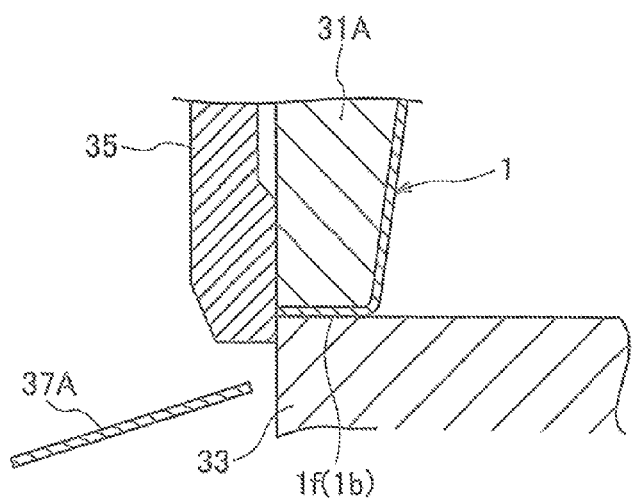
FIG. 6C is a processing step diagram which is subsequent to FIG. 6B and which shows the drawing method.

FIGS. 6A to 6C show a drawing method in a second embodiment of the present invention and are processing step diagrams corresponding to FIGS. 1A to 1C. In the second embodiment, the draw bead 1d is crushed and flattened by the die 39 and the punch 41 used in FIG. 1C, in a processing step of FIG. 6B subsequent to FIG. 6A showing a state where the workpiece 1 is drawn. Thereafter, as shown in FIG. 6C, cutting work is performed by using the lower pressing die 33 and the cutting blade 35 used in FIG. 1B as well as an upper pressing die 31A in such a way that part of a crushed portion of the draw bead 1d is left, and a scrap material 37A is generated.

In the embodiment, as in the first embodiment, the part of the flange portion 1b having the draw bead 1d is thereby formed into the flat portion 1f corresponding to the flange portion 19b of the sill outer 19 shown in FIG. 5B. Accordingly, in the embodiment, as in the first embodiment, the yield of material is better than that in the case where the flange portion 1b is removed in such a way that the entire draw bead 1d is included in the removed portion, and the lowering of the yield can be thus suppressed. Moreover, since the draw bead 1d is crushed and flattened after the drawing before being formed into the product to be used as the flange portion 19b, the product shape is less likely to be restricted, and decrease of the degree of freedom in the product shape can be suppressed.

In the first embodiment shown in FIGS. 1A and 1C, after the pan of the draw bead 1d is removed, the remaining part of the draw bead 1d is crushed. Meanwhile, in the second embodiment shown in FIGS. 6A to 6C, in reverse to the first embodiment, after the draw bead 1d is crushed, the part of the flange portion 1b is removed.

When the part of the draw bead 1d is already removed in the crushing of the draw bead 1d in FIG. 1C as in the first embodiment, the draw bead 1d has a shape smaller than that in the case where the part of the draw bead 1d is not removed. Accordingly, the crushing work is facilitated and the workability is improved. The flange portion 19b of the sill outer 19 which is the product can be thus accurately processed into a flat shape. Moreover, work of spot welding thereafter can be accurately performed and the reliability of the product is improved.

Meanwhile, when the draw bead 1d is already crushed and fattened in the removal of the part of the flange portion 1b in FIG. 6C as in the second embodiment, the cutting work is facilitated compared to the case where the draw bead 1d is not crashed. Hence, the accuracy of the dimensions of the flange portion 19b after the cutting can be further improved.

In the first and second embodiments described above, the pressure applied to the draw bead 1d in the case where the draw bead. 1d is crushed and flattened by the press work is set to be greater than the pressure applied to the draw bead 1d in the case where the protruding portion 1a being the drawn portion is formed by press-forming. The flange portion 19b can be thereby crushed and further flattened, and the quality of external appearance is further improved.

Moreover, in the first and second embodiments described above, the pressure is applied only to the portion of the draw bead 1d outside the protruding portion 1a when the draw bead 1d is crushed and flattened. In this case, the pressure applied to crush the draw bead 1d can be set smaller than that in a case where the pressure is applied to a portion including the protruding portion 1a. Moreover, smaller pressing dies can be used. Accordingly, it is possible to facilitate the press work and reduce equipment cost.

Although the part of the flange portion 1b is removed by the cutting work in such a way that the part of the draw bead 1d is left (i.e. the part of the draw bead 1d is not removed) in the first and second embodiments described above, the present invention is not limited to this. The part of the flange portion 1b may be removed by the cutting work in such a way that the entire draw bead 1d is left (i.e. the entire draw bead 1d is not removed). The effects described above can be obtained also in this case.

Figure 7A:
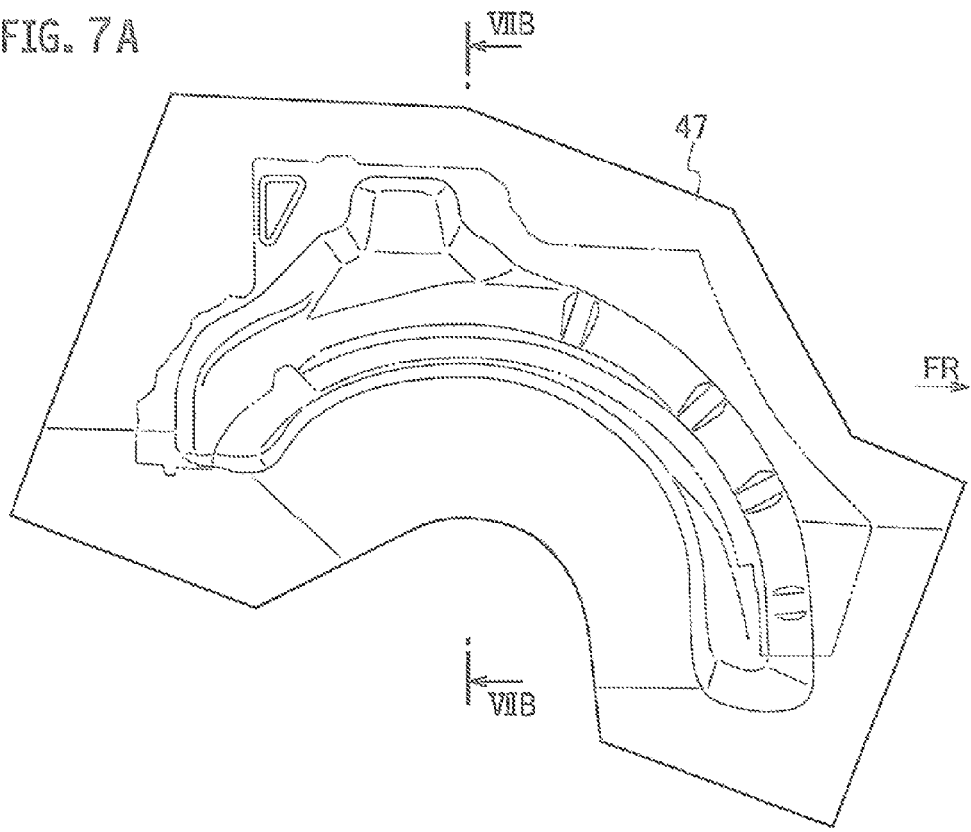
FIG. 7A is a side view showing an outer panel in a rear wheel house portion to which the drawing method of the embodiment of the present invention is applied.
Figure 7B:
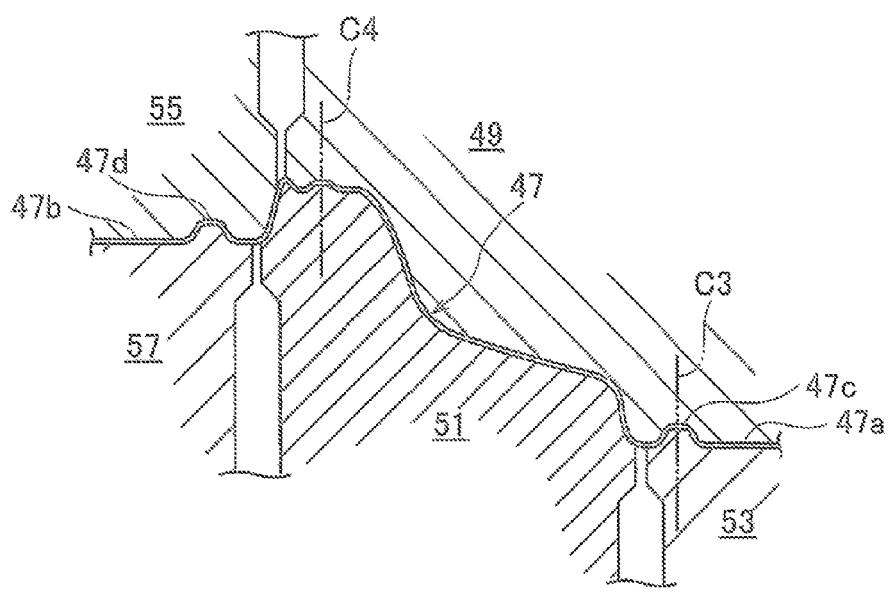
FIG. 7B is a cross-sectional view at the time of drawing which is taken along the VIIB-VIIB line in FIG. 7A.

FIG. 7A shows an outer panel of a rear wheel house portion of an automobile. FIG. 7B shows an example in which the drawing methods of the embodiments of the present invention are applied to the outer panel shown in FIG. 7A. A workpiece 47 which is a plate-shaped material to be formed into the outer panel is drawn into a specified shape by an upper die 49 and a lower die 51. The workpiece 47 shown in FIG. 7B corresponds to a cross-sectional portion along the VIIB-VIIB line in FIG. 7A. The direction shown by the arrow FR in FIG. 7A is the vehicle-body front side.

A right end portion 47a of the workpiece 47 in FIG. 7B is held by the upper die 49 and a lower blank holder 53, and a left end portion 47b thereof is held by upper and lower blank holders 55 and 57. Moreover, a draw bead 47c is provided in the end portion 47a between the upper die 49 and the lower blank holder 53, and a draw bead 47d is provided in the end portion 47b between the upper and lower blank holders 55 and 57. The upper die 49, the lower die 51, and the blank holders 53, 55, and 57 form a drawing die.

In this example, as in FIGS. 1B and 1C, after part of the draw bead 47c in the right end portion 47a in FIG. 7B is removed at the position of the cutting line C3, work of crushing and flattening the remaining part of the draw bead 47c is performed. Crushing and flattening the draw bead 47c facilitates spot welding of the crushed portion and the degree of adhesion in the welded portion is improved, thereby improving the watertightness. In the left end portion 47b, the cutting work is performed at the position of the cutting line C4 and the entire draw bead 47d is removed. In this example, as in the second embodiment shown in FIGS. 6A to 6C, it is possible to crush the draw bead 47c and then remove the part of the end portion 47a in such a way that the part of the draw bead 47c in the crushed portion is included in the removed portion.

Accordingly, the yield of the material in this example is better than that in the case where the end portion 47a of the workpiece 47 is removed in such a way that the entire draw bead 47c is included in the removed portion, and the lowering of the yield can be thus suppressed. Moreover, since the draw bead 47c is used by being crushed and flattened after the drawing before being formed into the product, the product shape is less likely to be restricted, and decrease of the degree of freedom in the product shape can be suppressed. Furthermore, crushing and flattening the draw bead 47c can improve the quality of external appearance. This is because, although the crushed portion is less likely to be visible unless a tire in the wheel house is removed, the crushed portion becomes visible when the tire is removed.

Figure 8A:
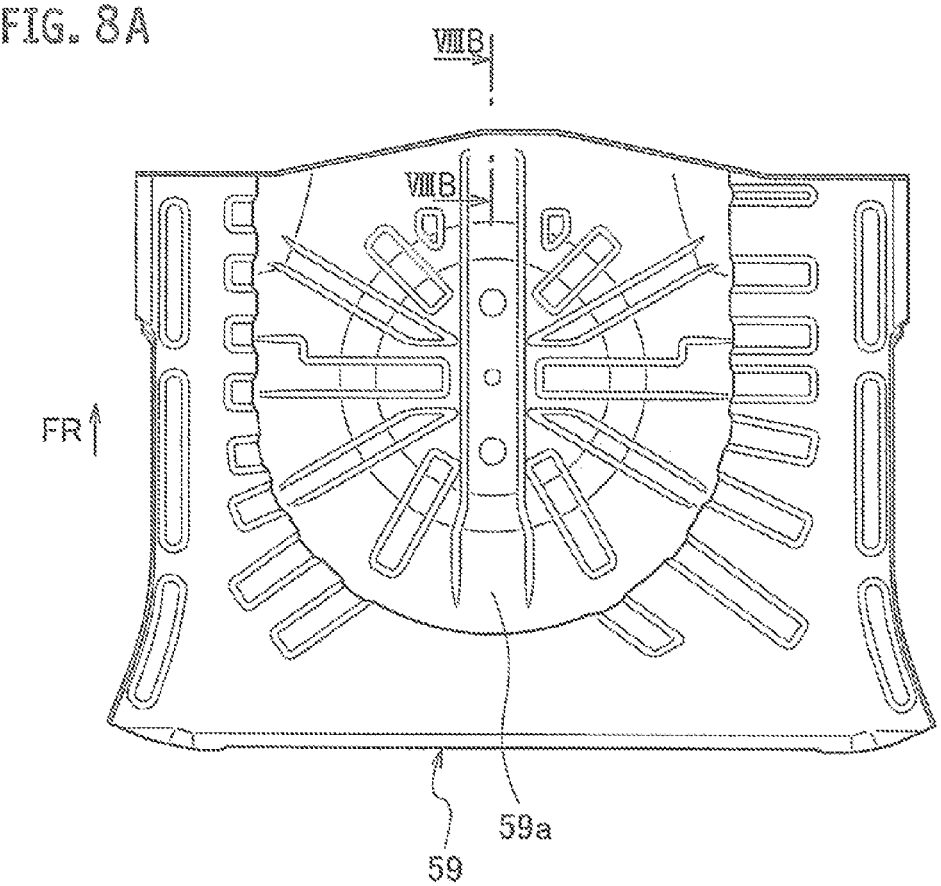
FIG. 8A is a plan view of a floor panel in which a spare tire storing portion is formed and to which the drawing method of the embodiment of present invention is applied.
Figure 8B:
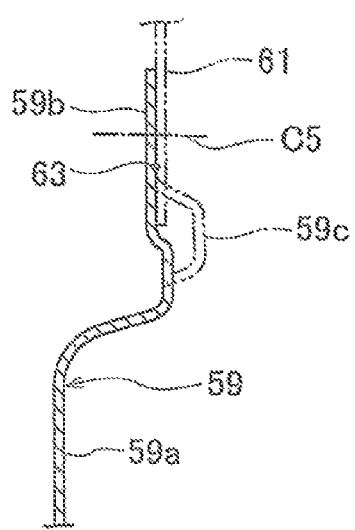
FIG. 8B is a cross-sectional view taken along the VIIB-VIIB line of FIG. 8A and shows a portion around a joining portion with a rear floor panel of the floor panel.

FIG. 8A shows a floor panel 59 including a tire storage recess portion 59a configured to store a not-illustrated spare tire in an automobile rear portion. FIG. 8B is a cross-sectional view along the VIIIB-VIIIB line FIG. 8A and shows an example in which the present invention is applied to the floor panel 59 in FIG. 8A. Note that the direction shown by the arrow FR in FIG. 8A is the vehicle-body front side. As shown in FIG. 8B, an end portion of a rear floor panel 61 on the vehicle-body rear side is made to overlap the vehicle-body front side of the floor panel 59 and is joined thereto.

In the floor panel 59 to which the present invention is applied, a draw bead 59c is formed in an end portion 59b on the side to be joined to the rear floor panel 61. The draw bead 59c is formed in drawing of the entire floor panel 59 and is then crushed after the drawing. Then, the crushed portion is welded and joined to the rear floor panel 61 by spot welding in a welding portion 63. The end portion 59b after the crushing of the draw bead 59c is removed by being cut at the position of the cutting line C5 before the spot welding as necessary.

In the example, the entire portion in which the draw bead 59c is provided is thus included in the product. Accordingly, a portion to be wasted due to cutting is reduced compared to a case where the end portion 59b is cut in such a way that the draw bead 59c is included in the removed portion, and the lowering of the yield of material can be suppressed.

Moreover, since a not illustrated floor cover is placed on the joining portion between the floor panel 59 and the rear floor panel 61, the joining portion is normally made invisible by the floor cover. However, since removing the floor cover makes the joining portion visible, the quality of external appearance can be improved by crushing the draw bead 59c.

Figure 9A:
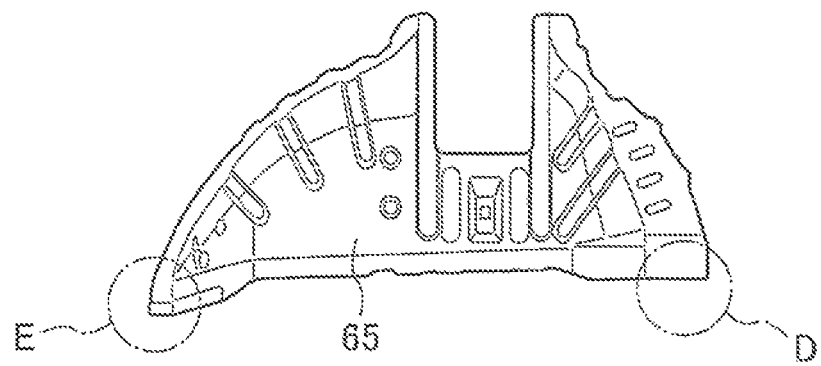
FIG. 9A is a side view of an inner panel in a rear wheel house portion to which the drawing method of the embodiment of the present invention is applied.
Figure 9B:
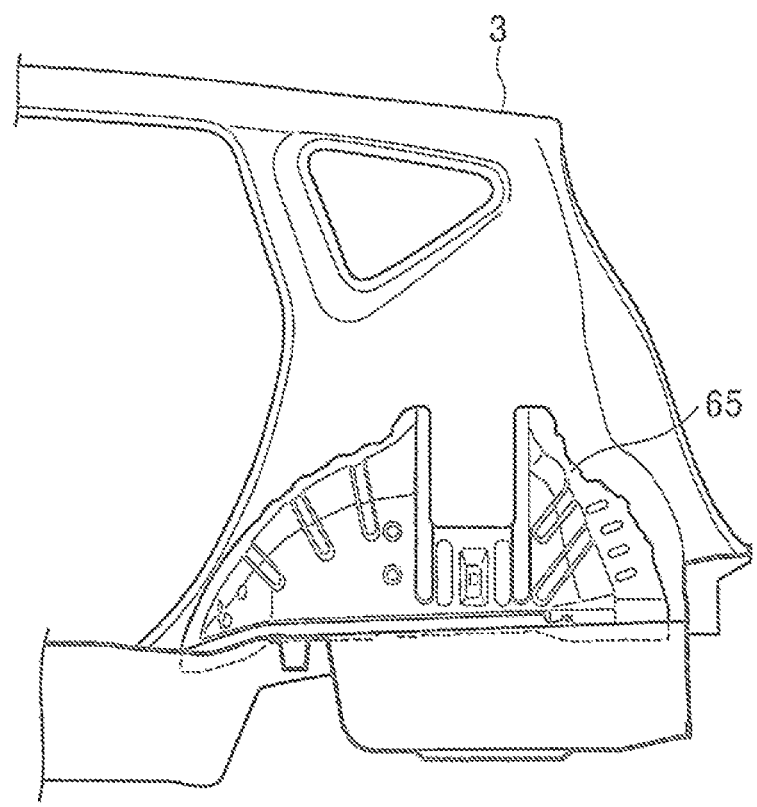
FIG. 9B is a side view showing the inner panel of FIG. 9A together with a body side.
Figure 10:
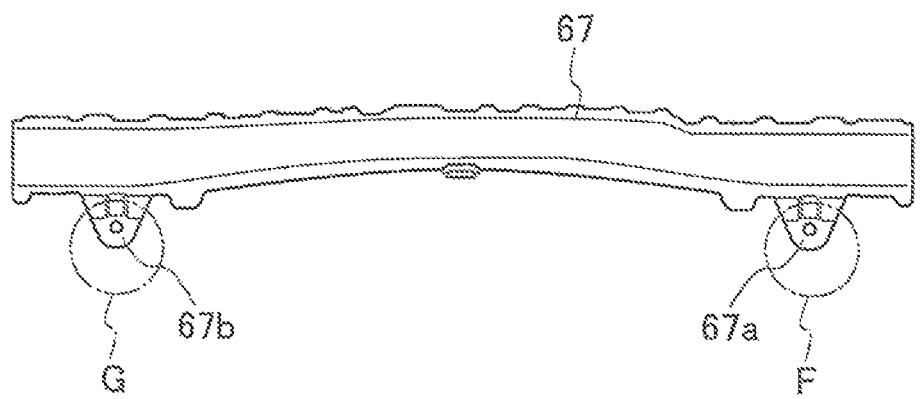
FIG. 10 is a plan view of a dash upper panel to which the drawing method of the embodiment of the present invention is applied.

Other portions to which the embodiments of the present invention can be applied include a D portion and an E portion of a rear wheel house inner panel 65 in a rear wheel house portion shown in FIGS. 9A and 9B and a F portion and a G portion including attachment flanges 67a and 67b provided near both sides, in a vehicle width direction, of a dash upper panel 67 shown in FIG. 10. The attachment flanges 67a and 67b are coupled to a not-illustrated dash floor panel.

In each of the portions (D portion, E portion, F portion, and G portion) shown in FIGS. 9A, 9B, and 10, a draw bead is formed in drawing work of the product and is crushed after the drawing, and part of the draw bead or the entire draw bead is incorporated in the product.

As described above, in the embodiments of the present invention, by crushing the draw bead used in the drawing of the drawn portion, the crushed portion can used as part of the product. The lowering of the yield of material can be thus suppressed. Moreover, since the draw bead is crushed after the drawing, the product shape is less likely to be restricted, and decrease of the degree of freedom in the product shape can be suppressed.

The entire content of Japanese Patent Application No. P2012-282192 (filed on Dec. 26, 2012) is herein incorporated by reference.

Although the present invention has been described above by reference to the embodiments and the example, the present invention is not limited to those, and it will be apparent to these skilled in the art that various modifications and improvements can be made.

REFERENCE SIGNS LIST 1, 47 workpiece (plate-shaped material)
1a protruding portion (drawn portion)
1d, 47c, 59c draw bead
25, 49 upper die (drawing die)
27, 51 lower die (drawing die)
29 blank holder (drawing die)
53, 55, 57 blank holder (drawing die)

The invention claimed is:

1. A drawing method comprising steps in the following order:
    forming a draw bead in a plate-shaped material, in which a drawn portion is to be formed, outside the drawn portion, the draw bead being used to adjust an inflow of the plate-shaped material into a drawing die;
    forming the drawn portion in the plate-shaped material by using the draw bead as formed;
    crushing and substantially flattening the draw bead using a die such that an entire bottom surface of the flattened draw bead contacts the die; and
    removing a portion in the plate-shaped material outside of the drawn portion such that at least part of the crushed and substantially flattened draw bead is left.

2. The drawing method according to claim 1, wherein, when the draw bead is crushed and substantially flattened, the draw bead is crushed by press work at a pressure greater than a pressure applied to the draw bead when the drawn portion is formed by press-forming.

3. The drawing method according to claim 1, wherein, when the draw bead is crushed, a pressure is applied only to the draw bead in the plate-shaped material outside the drawn portion.

4. The drawing method according to claim 1, wherein, after the draw bead is crushed and substantially flattened, the draw bead as crushed is joined to a flange of a different member.

5. The drawing method according to claim 4, wherein, in the step of joining the draw bead as crushed to the flange of the different member, the draw bead as crushed is joined to the flange of the different member by spot welding.

* * * * *